United States Patent
Wollmershauser et al.

(10) Patent No.: US 10,075,773 B2
(45) Date of Patent: Sep. 11, 2018

(54) COMMUNITY INTERNET PROTOCOL CAMERA SYSTEM

(71) Applicant: AT&T INTELLECTUAL PROPERTY I, LP, Atlanta, GA (US)

(72) Inventors: Steven M Wollmershauser, San Antonio, TX (US); William O. Sprague, Jr., Wimberley, TX (US); Eric Harris, Frisco, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/163,267

(22) Filed: May 24, 2016

(65) Prior Publication Data

US 2016/0269799 A1    Sep. 15, 2016

Related U.S. Application Data (63) Continuation of application No. 11/851,958, filed on Sep. 7, 2007, now Pat. No. 9,380,272.

(51) Int. Cl.
| | |
|---|---|
| *H04N 21/61* | (2011.01) |
| *H04L 12/66* | (2006.01) |
| *H04N 21/432* | (2011.01) |
| *H04N 21/4223* | (2011.01) |
| *H04N 21/258* | (2011.01) |
| *H04L 29/06* | (2006.01) |
| *H04N 7/18* | (2006.01) |
| *H04N 21/6587* | (2011.01) |

(52) U.S. Cl.
CPC ......... *H04N 21/6125* (2013.01); *H04L 12/66* (2013.01); *H04L 65/4076* (2013.01); *H04N 7/181* (2013.01); *H04N 21/25816* (2013.01); *H04N 21/4223* (2013.01); *H04N 21/4325* (2013.01); *H04N 21/6587* (2013.01)

(58) Field of Classification Search
None
See application file for complete search history.

(56) References Cited

U.S. PATENT DOCUMENTS

| | | |
|---|---|---|
| 5,450,123 A | 9/1995 | Smith |
| 6,009,410 A | 12/1999 | Lemole |
| 6,084,510 A * | 7/2000 | Lemelson ............ G08B 15/004 340/539.13 |
| 6,292,210 B1 | 9/2001 | Gerszberg |
| 6,850,252 B1 * | 2/2005 | Hoffberg ............ G06K 9/00369 348/E7.061 |
| 7,065,140 B1 | 6/2006 | Ritter et al. |
| 7,197,228 B1 * | 3/2007 | Monroe ................ H04N 5/782 386/201 |
| 7,342,514 B1 * | 3/2008 | Bailey ................. G01C 23/005 340/961 |
| 7,839,926 B1 * | 11/2010 | Metzger ................ H04N 5/144 375/240.01 |
| 8,471,903 B2 | 6/2013 | Diroo et al. |

(Continued)

*Primary Examiner* — Mohammad J Rahman
(74) *Attorney, Agent, or Firm* — Guntin & Gust PLC; Atanu Das (57) ABSTRACT

An apparatus comprises a server in communication with a camera located on a customer premises. The server is adapted to transmit Internet Protocol formatted video, containing a surveillance portion from the camera and an advertisement portion, to a customer premises device. A method for sending the Internet Protocol formatted video is also disclosed.

20 Claims, 8 Drawing Sheets

(56) References Cited

U.S. PATENT DOCUMENTS

| | | |
|---|---|---|
| 2002/0097322 A1 | 7/2002 | Monroe et al. |
| 2002/0170064 A1 | 11/2002 | Monroe et al. |
| 2003/0236904 A1* | 12/2003 | Walpole .............. H04L 12/1881 |
| | | 709/231 |
| 2005/0062905 A1* | 3/2005 | Kim ..................... G02F 1/1323 |
| | | 349/95 |
| 2005/0108091 A1 | 5/2005 | Sotak |
| 2005/0195972 A1 | 9/2005 | Barr et al. |
| 2006/0123053 A1* | 6/2006 | Scannell, Jr. ..... G06F 17/30035 |
| 2006/0161928 A1 | 7/2006 | Douglass et al. |
| 2006/0253864 A1 | 11/2006 | Easty |
| 2007/0006081 A1 | 1/2007 | Maehata et al. |
| 2007/0014542 A1 | 1/2007 | Poulsen et al. |
| 2007/0052543 A1 | 3/2007 | Albarado et al. |
| 2007/0061266 A1 | 3/2007 | Moore et al. |
| 2007/0094698 A1* | 4/2007 | Bountour ............... H04N 7/181 |
| | | 725/132 |
| 2007/0130538 A1 | 6/2007 | Chiu |
| 2007/0271122 A1 | 11/2007 | Zaleski et al. |
| 2008/0092158 A1* | 4/2008 | Bhatnagar .......... H04N 7/17318 |
| | | 725/34 |
| 2008/0098068 A1 | 4/2008 | Ebata et al. |
| 2008/0134063 A1 | 6/2008 | Volach |
| 2008/0222689 A1 | 9/2008 | Howcroft et al. |
| 2008/0247457 A1 | 10/2008 | Cromwell |
| 2008/0253608 A1 | 10/2008 | Long et al. |
| 2008/0288989 A1 | 11/2008 | Zheng et al. |
| 2009/0058845 A1 | 3/2009 | Fukuda et al. |
| 2010/0253546 A1* | 10/2010 | Ibrahim ............... G08G 5/0008 |
| | | 340/961 |

\* cited by examiner

COMMUNITY INTERNET PROTOCOL CAMERA SYSTEM

CROSS-REFERENCE TO RELATED APPLICATIONS

This application is a continuation of and claims priority to U.S. patent application Ser. No. 11/851,958 filed Sep. 7, 2007, the contents of which is hereby incorporated by reference into this application as if set forth herein in full.

FIELD OF THE DISCLOSURE

This invention generally relates to camera systems, and more particularly relates to community Internet protocol camera systems.

BACKGROUND OF THE DISCLOSURE

Apartment complexes and gated communities frequently provide their occupants with access, either through their television or over the Internet, to surveillance cameras on the grounds. Thus, tenants in an apartment building may tune to a particular channel on their television to view the front door to the building, the lobby, and/or any other location where cameras are connected to the system. U.S. Pat. No. 7,065,140, for example, shows a method and apparatus for receiving video signals from a plurality of video cameras, such as in a video surveillance system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
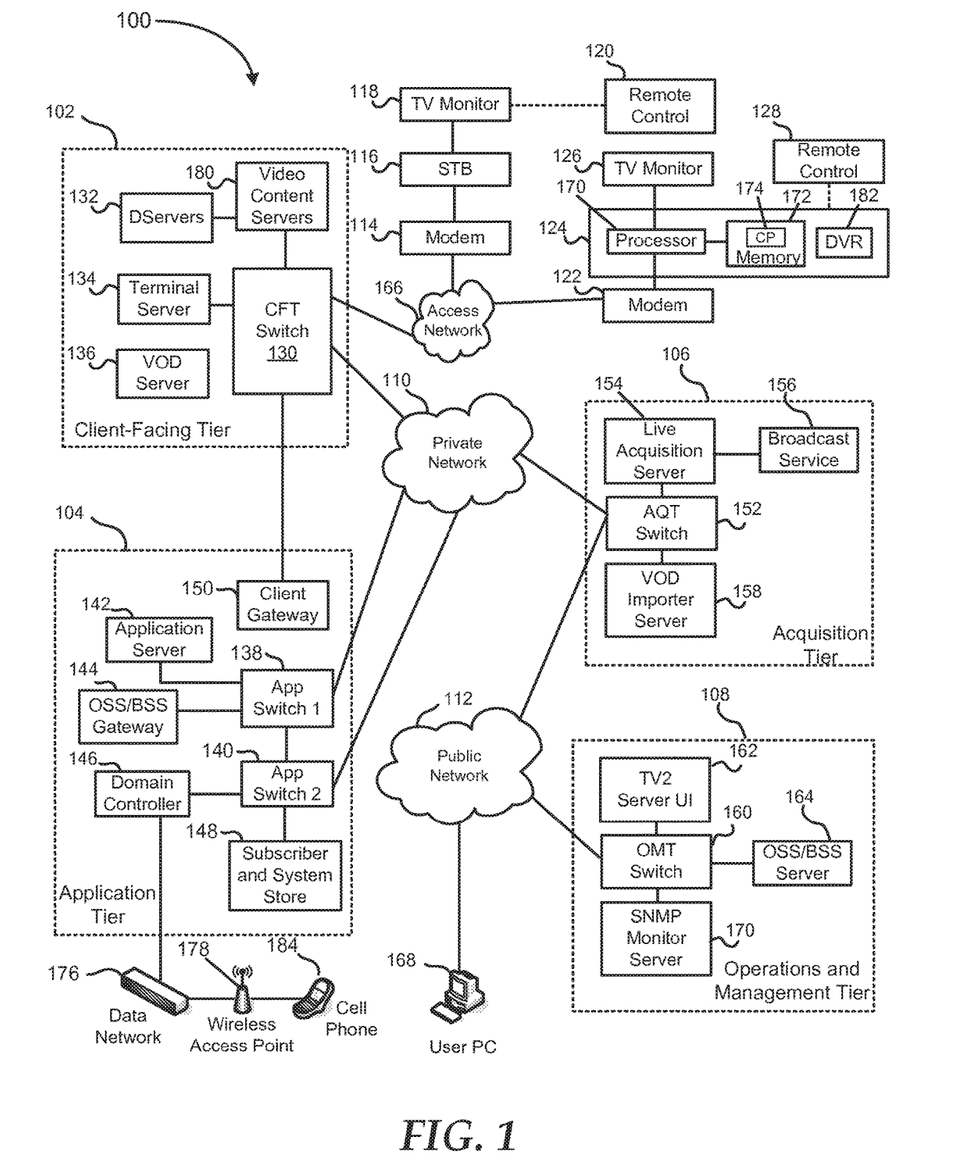
FIG. 1 is a block diagram illustrating an embodiment of an Internet protocol television (IPTV) system.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to a public network such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box (STB) device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include an STB processor 170 and an STB memory device 172 that is accessible to the STB processor.

In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136. When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer 168 coupled to the public network 112.

The domain controller 146 communicates with the public network 112 via the second APP switch 140. Additionally, the domain controller 146 can communicate via the public network 112 with the personal computer 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include an STB computer program 174 that is embedded within the STB memory device 172. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these. Further details of the IPTV system are taught in U.S. Patent Application Publication No. 2007/0083895, the disclosure of which is hereby incorporated by reference.

Figure 2:
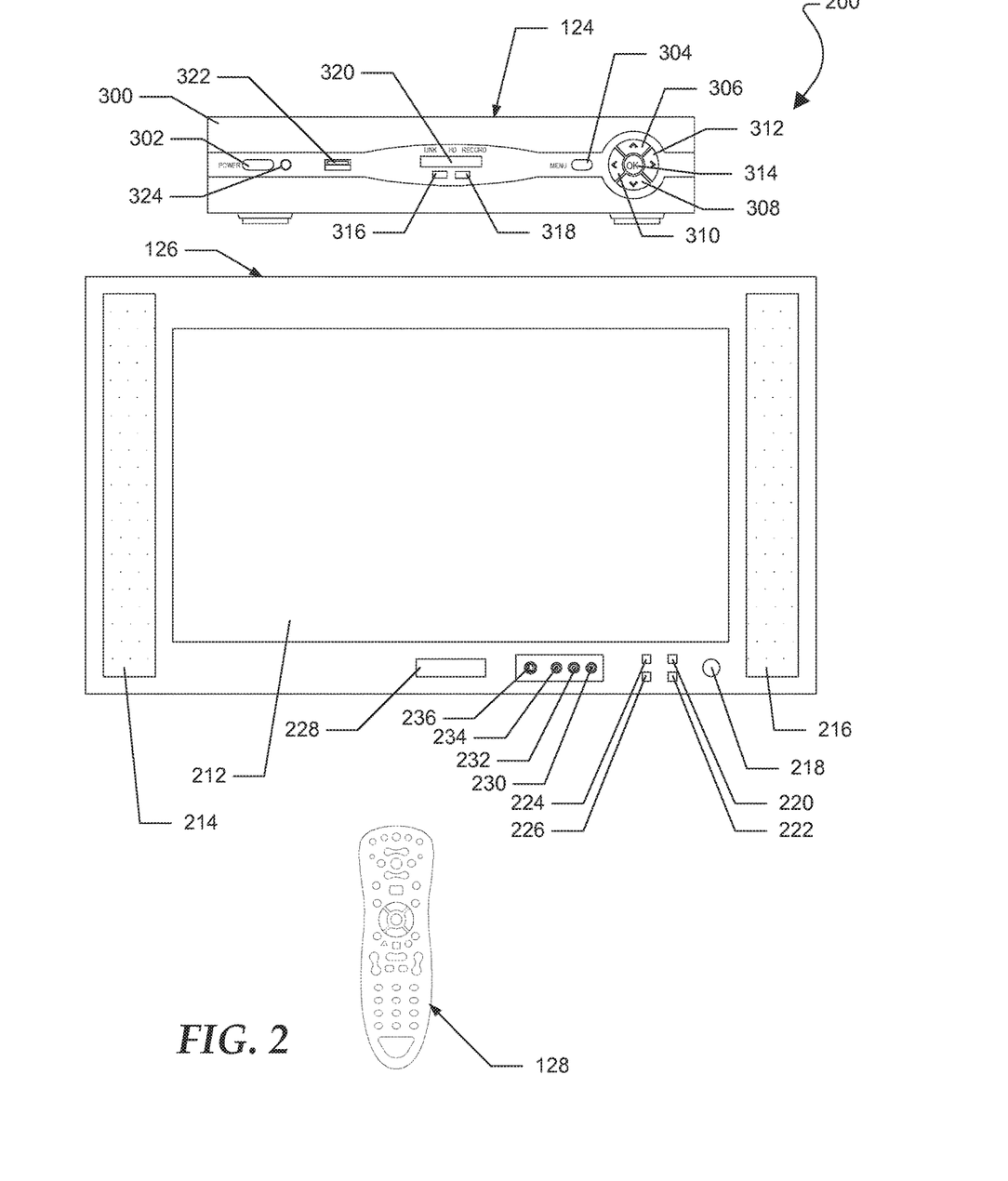
FIG. 2 is a front plan view of a video monitoring system.

FIG. 2 shows a video system 200 including the display device 126, the IPTV receiver set-top box 124, and the remote control device 128. The display device 126 includes a display screen 212, and speakers 214 and 216. A power button 218, a channel up button 220, a channel down button 222, a volume up button 224, and a volume down button 226 perform well-known functions. The display device 126 also includes an infrared (IR) receiver, a radio frequency (RF) receiver, or a similar receiver 228 incorporated therein. The display device 126 can include a right channel RCA connector 230, a left channel RCA connector 232, and a composite video RCA connector 234. Additionally, the display device 126 can include an S-video connector 236.

The IPTV receiver 124 can include a front panel 300 having a power button 302, a menu button 304, an up button 306, a down button 308, a left button 310, a right button 312, and an OK button 314. The front panel 300 of the IPTV receiver 124 can also include a transmitter 316 and a receiver 318 incorporated therein. In a particular embodiment, the transmitter 316 can be an IR transmitter, an RF transmitter, or a similar transmitter. Further, the receiver 318 can be an IR receiver, an RF receiver, or a similar receiver. The front panel 300 of the IPTV receiver 124 can include a display 320, a universal serial bus (USB) connector 322, and a power-on light 324. The display 320 can be a light emitting diode (LED) display, a liquid crystal display (LCD), or some other display. The power-on light 324 is preferably a light emitting diode (LED).

Figure 3:
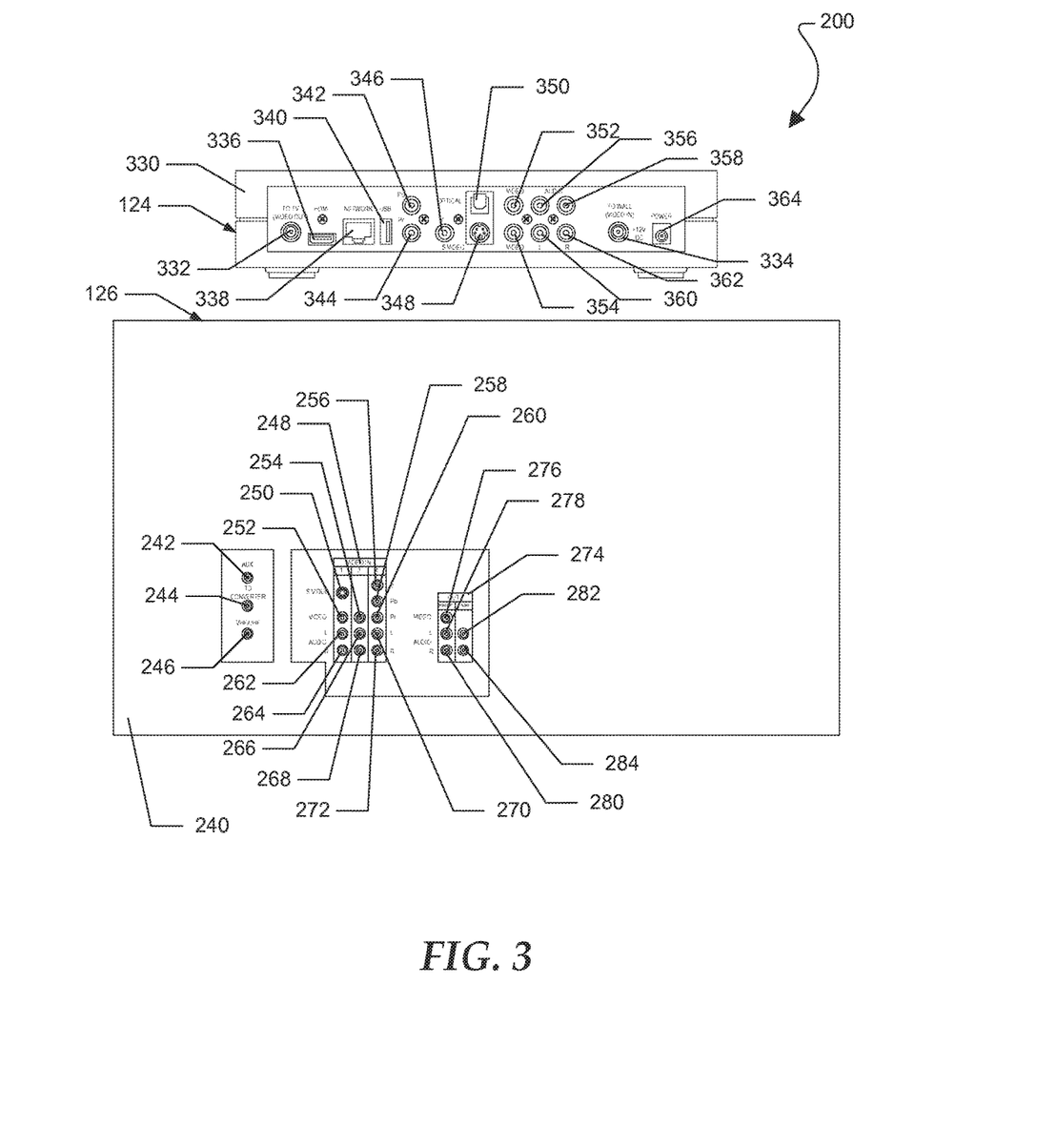
FIG. 3 is a rear plan view of the video monitoring system.

FIG. 3 shows that the display device 126 has a rear panel 240 that can include a plurality of connectors such as a first RF connector 242, a second RF connector 244, and a third RF connector 246. The rear panel 240 can also include a video in panel 248 having an S-video connector 250, a first composite video Radio Corporation of America (RCA) connector 252, and a second composite video RCA connector 254. The video in panel 248 can also include a Y component RCA connector 256, a Pb component RCA connector 258, and a Pr component RCA connector 260. Further, the video in panel 248 can include a first left channel RCA connector 262, a first right channel RCA connector 264, a second left channel RCA connector 266, a second right channel RCA connector 268, a third left channel RCA connector 270, and a third right channel RCA connector 272. The rear panel 240 can include a video out panel 274 having a composite video RCA connector 276, a first left channel RCA connector 278, a first right channel RCA connector 280, a second left channel RCA connector 282, and a second right channel RCA connector 284.

The IPTV receiver 124 can include a rear panel 330 with a first RF connector 332, a second RF connector 334, a high definition multi-media interface (HDMI) connector 336, a network connection 338, and a USB connection 340. In a particular embodiment, the network connection 338 can be an RJ-45 port and can allow the IPTV receiver 124 to be connected to an IPTV network via an Ethernet cable. The rear panel 330 of the IPTV receiver 124 can also include a Pb component RCA connector 342, a Pr component RCA connector 344, and a Y component RCA connector 346. The rear panel 330 can include an S-video connector 346 and an optical video connector 350. Additionally, the rear panel 330 of the IPTV receiver 124 can include a first composite video RCA connector 352, and a second composite video RCA connector 354. Further, the rear panel 330 of the IPTV receiver 124 can include a first left channel RCA connector 356, a first right channel RCA connector 358, a second left channel RCA connector 360, and a second right channel RCA connector 362. The rear panel 330 of the IPTV receiver 124 can also include a power input connector 364.

Figure 4:
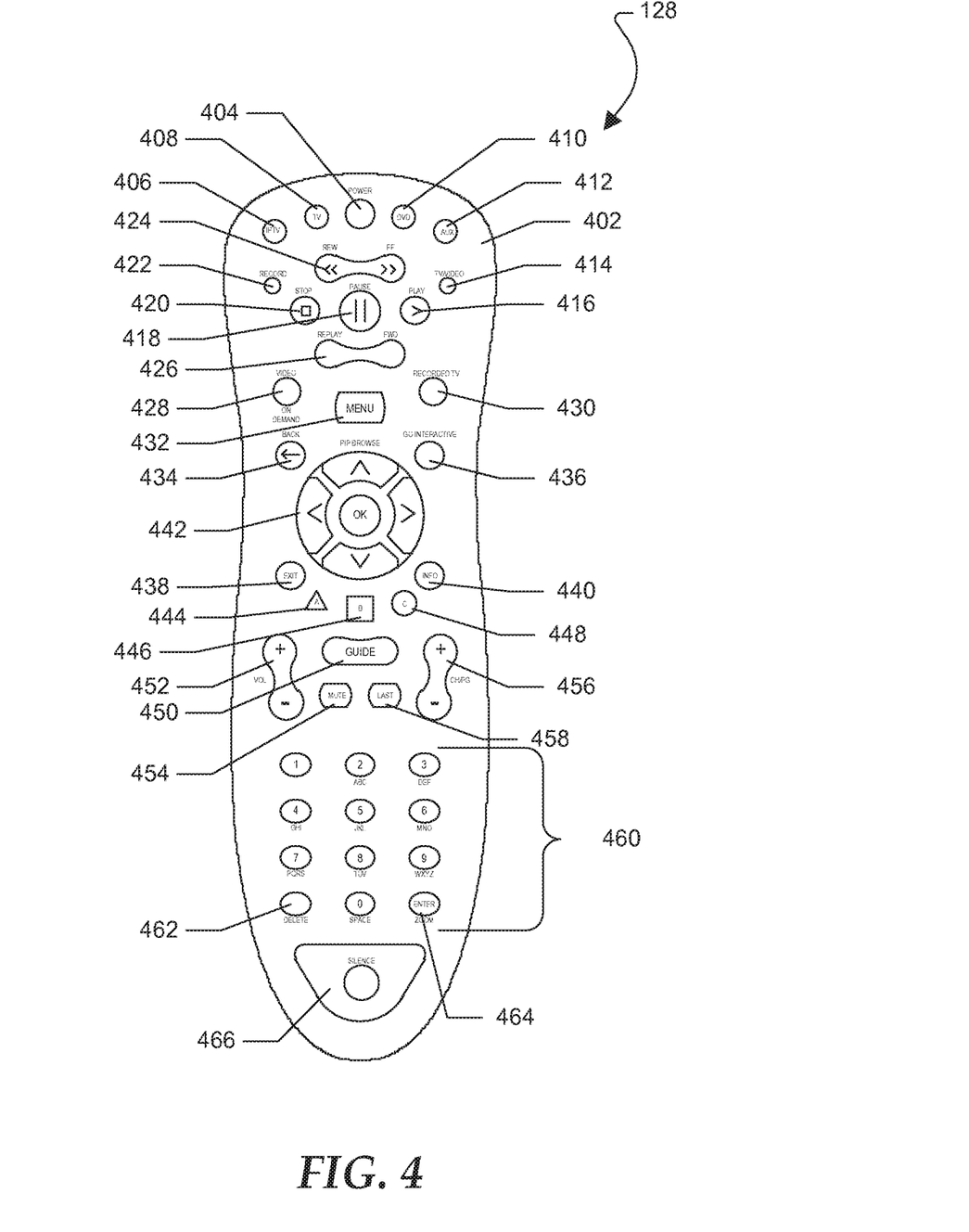
FIG. 4 is a plan view of a remote control device.

FIG. 4 shows the remote control device 128 including a housing 402 having a plurality of buttons. For example, the remote control device 128 can include a power button 404, an IPTV button 406, a television (TV) button 408, a digital video disc (DVD) button 410, and an auxiliary (AUX) button 412. When the IPTV button 406 is pressed, the remote control device 128 can be used to control the IPTV receiver 124. When the TV button 408 is pressed, the remote control device 406 can be used to control the display device 126 connected to the IPTV receiver 124. When the DVD button 410 is pressed, the remote control device 128 can be used to control a DVD player connected to the display device 126, the IPTV receiver 124, or both. Additionally, when the AUX button 412 is pressed, the remote control device 128 can be used to control an auxiliary device connected to the display device 126, the IPTV receiver 124, or both. For example, the auxiliary device can be a compact disc (CD) player, a video cassette recorder (VCR), an audio receiver, or some other home entertainment device.

The remote control device 128 can include a TV/VIDEO button 414 that can be used to toggle between television content and video content, e.g. from a DVD player. The remote control device 128 can also include a PLAY button 416, a PAUSE button 418, a STOP button 420, a RECORD button 422, a rewind (REW)/fast forward (FF) button 424, and a replay/slow forward (FWD) button 426. These buttons can be used to control the content received at the IPTV receiver or video content received from a DVD player. One or more of these buttons can also be programmed to control a CD player, a VCR, or some other home entertainment device. The remote control device 128 can also include a VIDEO ON DEMAND button 428 and a RECORDED TV button 430. The VIDEO ON DEMAND button 428 can be pressed in order to access on demand video content available via the IPTV receiver. The RECORDED TV button 430 can be pressed in order to access television content recorded at the IPTV receiver.

The remote control device 128 can also include a MENU button 432, a BACK button 434, a GO INTERACTIVE button 436, an EXIT button 438, and an INFO button 440. The MENU button 432 can be used to access a menu of features provided by the IPTV receiver. Further, the INFO button 444 can be used to access an information window provided by the IPTV receiver. The GO INTERACTIVE button 436 can be used to access interactive content provided by the IPTV system. The remote control device 128 can include a directional keypad 442. The directional keypad 442, the BACK button 434, and the EXIT button 438 can be used to navigate within the various content windows provided by the IPTV receiver. The remote control device 128 can also include a triangular A button 444, a square B button 446, and a round C button 448. The A button 444, the B button 446, and the C button 448 can be used to make various selections when navigating within a menu screen, an information screen, or some other screen provided by the IPTV receiver.

The remote control device 128 can further include a GUIDE button 450 that can be pressed in order to access an electronic programming guide for the content provided by the IPTV receiver. Moreover, the remote control device 128 can include a volume (VOL) up/down button 452, a MUTE button 454, a channel/page (CH/PG) up/down button 456, and a LAST button 458. The VOL button 452 can be used to control the volume of an IPTV receiver, a TV, a CD player, etc. The MUTE button 454 can be used to mute audio content provided by an IPTV receiver, a TV, a CD player, etc. The CH/PG button 456 can be used to change the channel at an IPTV receiver or navigate from page-to-page within a content guide provided by an IPTV receiver. The LAST button 458 can be used to return to the last channel viewed by the user at the IPTV receiver.

The remote control device 128 can include a numerical keypad 460 having a plurality of buttons that are individually numbered 1, 2, 3, 4, 5, 6, 7, 8, 9, and 0. The numerical keypad 460 is configured similar to a telephone keypad and each individual button also includes a portion of the alphabet. The 2 button includes ABC, the 3 button includes DEF, the 4 button includes GHI, the 5 button includes JKL, the 6 button includes MNO, the 7 button includes PQRS, the 8 button includes TUV, and the 9 button includes WXYZ. The 0 button can also be used as a SPACE button. In a particular embodiment, the numerical keypad 460 can be used to input a specific channel number. Further, the numerical keypad 460 can be used to input text to the IPTV system, when necessary, using the triple tap method well known in the art.

The numerical keypad 460 can also include a DELETE button 462 and an ENTER/ZOOM button 464.

Figure 5:
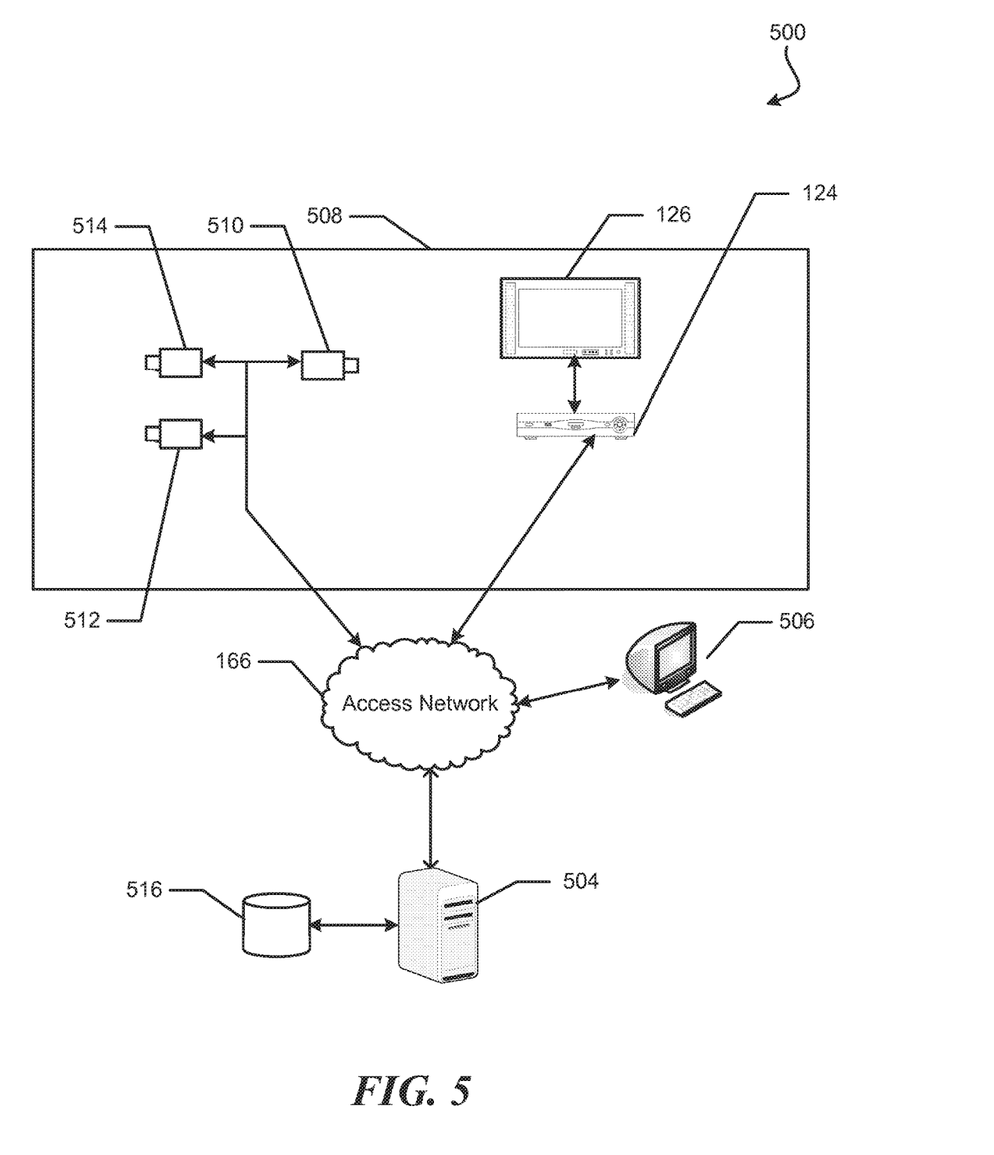
FIG. 5 is a block diagram of a community Internet protocol camera system.

FIG. 5 shows a community Internet protocol camera system 500 including a surveillance server 504, a customer premises device such as the IPTV receiver 124, and a plurality of cameras 510, 512, and 514. The cameras 510, 512, and 514 and the surveillance server 504 may be situated on a community premises 508, and directly connected, to facilitate a closed-circuit-like connection with the IPTV receiver 124. For example, the first camera 510 may be placed to view a main gate, the second camera 512 may be placed to view a parking lot, and the third camera 514 may be placed to view a laundry room on the community premises 508. Alternatively, the cameras may have a digital subscriber line (DSL) or other Internet connection to communicate with the surveillance server 504 through the access network 166. In the latter case as shown, the surveillance server 504 communicates with the IPTV receiver 124 and/or a computer 506 through the access network 166. Regardless, a user can preferably connect to the surveillance server 504 from any location through the access network 166.

The cameras 510, 512, and 514 transmit images from their locations on the community premises 508 to the surveillance server 504. In an embodiment, the cameras 510, 512, and 514 are either charge-coupled device (CCD) or complementary metal-oxide-semiconductor (CMOS) digital cameras capable of transmitting video images to the surveillance server 504 or directly to the IPTV receiver 124 and/or the computer 506. The cameras 510, 512, and 514 preferably transmit using Internet Protocol, but it should be understood that the video images may be converted to Internet Protocol after they are captured.

The surveillance server 504 is preferably in communication with the advertisement database 516 either directly or through an IP network. The surveillance server 504 combines the video stream received from the cameras 510, 512, and 514 with an advertisement portion from the advertisement database 516. The advertisement portion may be a continuous video stream that is preferably a full motion video similar to a television advertisement and/or a still advertisement image. The combined IP formatted video stream is preferably sent over the access network 166 to the IPTV receiver 124 and/or the computer 506, which decode the IP formatted video stream and output the video to the display device 126 and/or the computer monitor. In an embodiment, the advertisement portion may be downloaded and stored by the IPTV receiver 124 and/or the computer 506 in its entirety prior to the advertisement portion being outputted to the display device 126 and/or the computer monitor. It should be appreciated that the IPTV receiver 124, the display device 126, and the computer 506 may or may not be located on the community premises 508.

Figure 6:
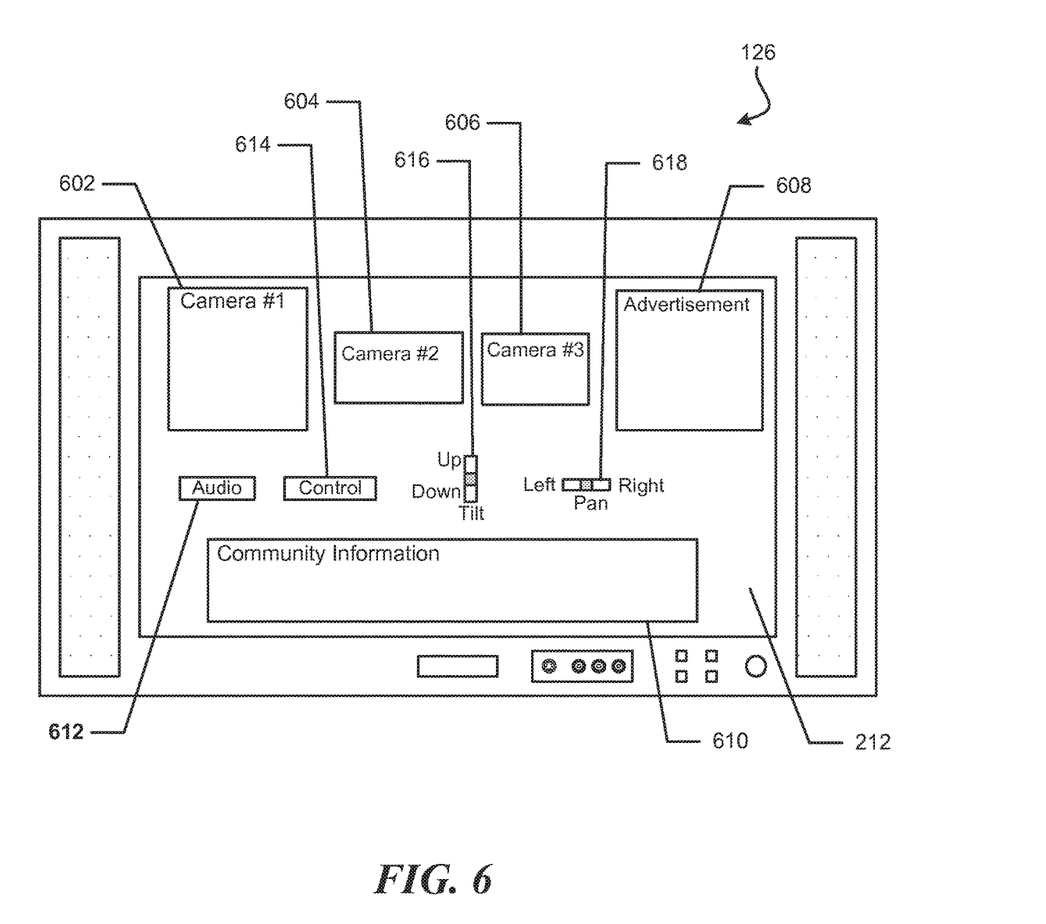
FIG. 6 is a front plan view of an embodiment of a display screen of the community Internet protocol camera system.

FIG. 6 shows an embodiment of the display device 126 including the display screen 212 having a first video display 602, a second video display 604, and a third video display 606. The display screen 212 also preferably has a video advertisement display 608 and a community information display 610. The first video display 602, the second video display 604, and the third video display 606 can provide the user with respective views from the cameras 510, 512, and 514. In an exemplary embodiment, only the camera view displayed in the first video display 602 is a live video stream, and the camera views displayed in the second and third video displays 604 and 606 are still images taken from the other cameras. The surveillance server 504 preferably updates the still images periodically in the combined video stream sent to the IPTV receiver 124. The user may change the live video stream camera view by alternating the different views from the cameras 510, 512, and 514 among the video displays 602, 604, and 606. For example, if the user requests to view the live video stream of the camera displayed in the second video display 604 (a still image), then the camera view is preferably moved to the first video display 602 (the live video display) and the camera view originally presented in the first video display is moved to the second video display and outputted as a still image. However, depending on the embodiment and the bandwidth available to the IPTV receiver 124 and/or the computer 506, multiple camera views may be provided as live video feeds to the display device at the same time.

The user preferably has a plurality of controls for the cameras 510, 512, and 514 presented on the display screen 212. The controls include an audio button 612, a control button 614, a camera tilt control 616, and a camera pan control 618. Audio associated with the advertisement displayed in the video advertisement display 608 is output to the user, unless the user selects the audio button 612 under the first video display 602, which turns off the advertisement audio and then outputs the audio associated with the surveillance video playing in the first video display 602. The audio continues to play for the surveillance video until the user re-selects the audio button 612, at which time the audio for the video advertisement display 608 turns on again. The user may select the arrow and OK buttons on the directional keypad 442 of the remote control device 128 (FIG. 4) to highlight and select the different video displays and the controls presented on the display screen 212.

In an embodiment, the user may control the view of the camera presented in the first video display 602 by selecting the control button 614. Thus, the user may cause the camera to tilt up or down using the tilt control 616, and to pan left or right using the pan control 618. Alternatively, the user can control the tilt and pan of the camera using the up and down arrows and the left and right arrows, respectively, of the directional keypad 442 on the remote control device 128 (FIG. 4). Similarly, if the computer 506 is being used to function as the display device, a mouse and/or a keyboard in communication with the computer 506 may function to control the camera views.

The display screen 212 preferably presents a video advertisement in the video advertisement display 608. The video advertisement is preferably a continuous stream of advertisements received by the surveillance server 504 from the advertisement database 516 (FIG. 5). The video advertisement can be displayed on the display screen 212 simultaneously with the live video and still images from the camera 510, 512, and 514. The community information display 610 preferably presents the name of the community along with additional information such as weather or traffic information, community events, or video and audio clips about the community.

Figure 7:
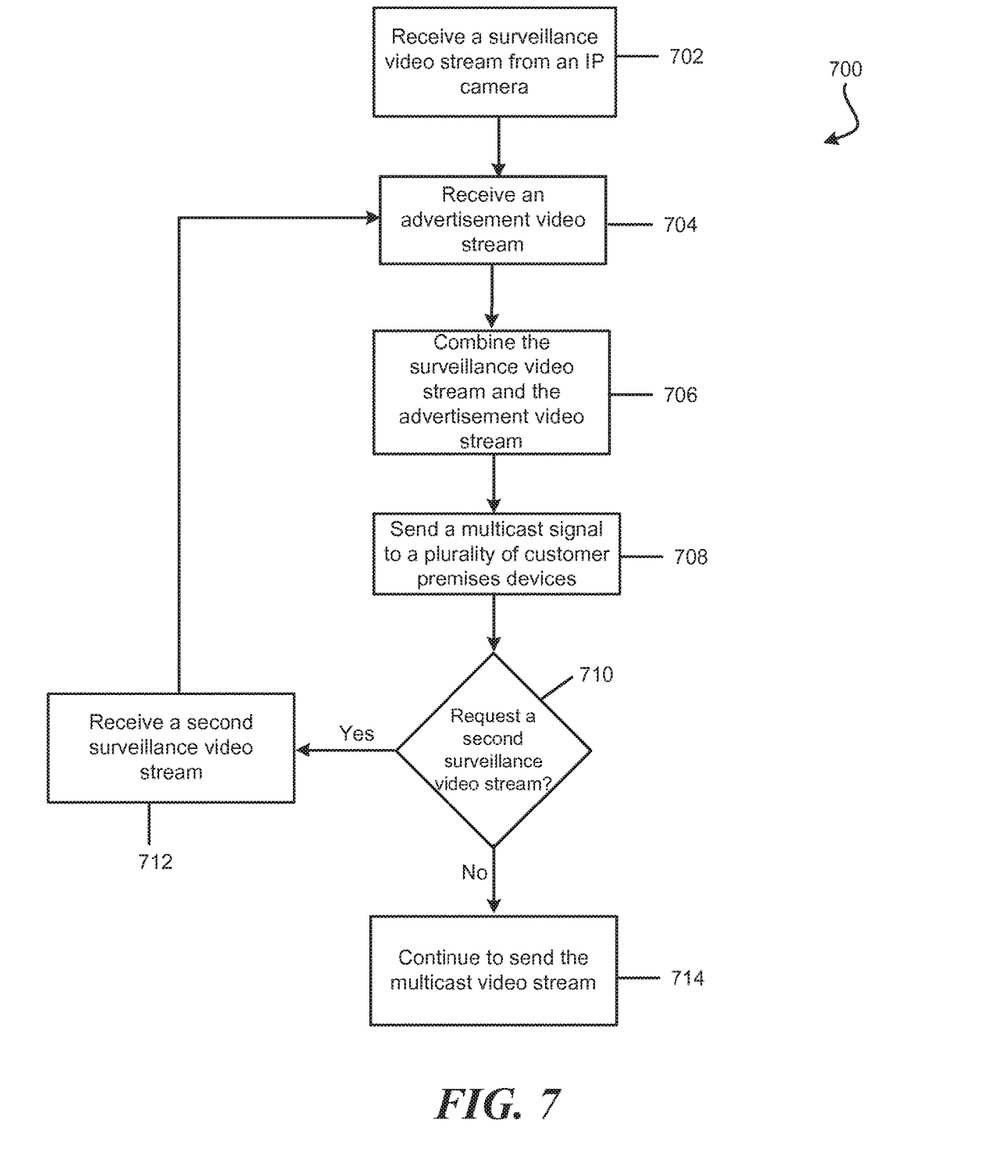
FIG. 7 is a flow chart of a method for providing a surveillance video with an advertisement.

FIG. 7 shows a flow chart of a method 700 for providing a surveillance video with an advertisement to a user. At block 702, a surveillance server receives a plurality of surveillance videos from a plurality of cameras. The cameras preferably send the surveillance videos to the surveillance server for processing into a format such as IP capable of viewing on an IPTV receiver and/or a computer. The surveillance server receives an advertisement from an advertisement database at block 704. The advertisement is preferably in an IP format that is capable of being combined with the surveillance video stream.

At block 706, the surveillance server combines the surveillance video stream with the advertisement video stream. The combined video stream can be replicated so that it may be sent as a multicast video stream to a plurality of users. The surveillance server sends the combined video stream to a plurality of customer premises devices at block 708. This multicast video stream differs from a broadcast video stream in that a broadcast video stream is sent to every possible endpoint on a network while the multicast video stream is sent only to a select number of endpoints, thus conserving bandwidth on the IP network.

The surveillance server preferably sends one live video feed from a single camera selected from a plurality of surveillance cameras to a customer premises device at a time. The views from the other cameras are preferably sent only as still images that are periodically updated in the video stream sent to the customer premises device. The user of the customer premises device may request that a different camera view be sent as the live video feed. At block 710, the surveillance server determines whether a request for a second surveillance video stream is received. If a second surveillance video stream is requested, the surveillance server receives the second video stream for the live video feed at block 712. The method continues as stated above at block 704. At block 714, if a second surveillance video stream is not requested, the surveillance video stream continues to send the current video stream to a plurality of customer premises devices.

Figure 8:
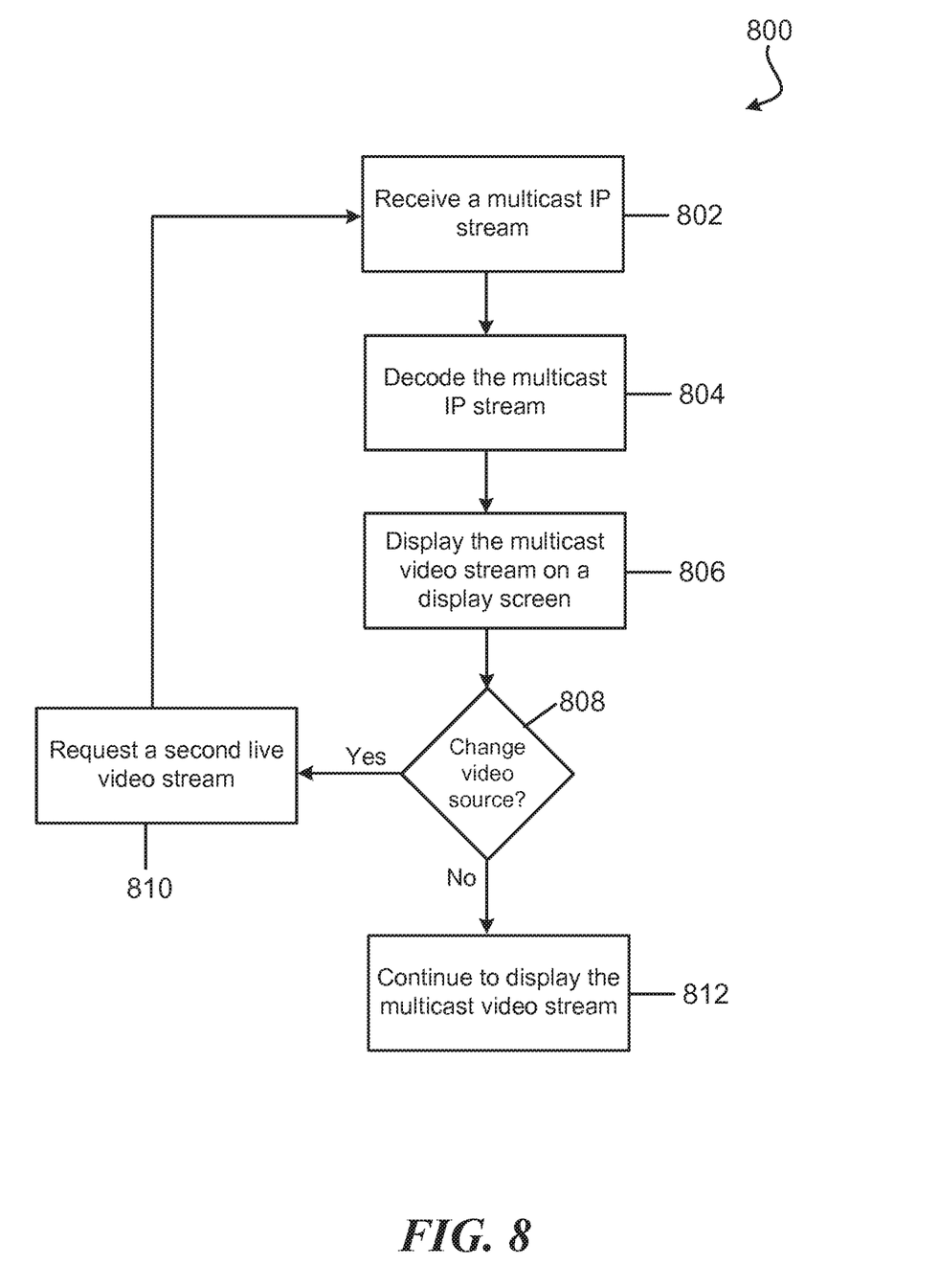
FIG. 8 is a flow chart of a method for displaying the surveillance video and the advertisement.

FIG. 8 shows a flow chart of a method 800 for displaying both the surveillance video and the advertisement to a user. At block 802, a customer premises device receives an IP formatted video stream from the surveillance server. The video stream preferably includes a surveillance video portion and an advertisement video portion. The customer premises device decodes the IP video stream at block 804. Decoding the video stream preferably includes providing the surveillance video portion and the advertisement video portion in a format that may be presented on a display screen, such as a television and/or a computer monitor.

At block 806, the customer premises device displays the video stream on a display device. The surveillance video portion from one camera, the advertisement video portion, and still images of views from other cameras can be presented simultaneously on the display screen. The customer premises device determines whether a user requests a surveillance video portion from a different camera at block 808. At block 810, if the user requests a surveillance video portion from a different camera, the customer premises device requests a second surveillance video portion from the surveillance server. The customer premises device preferably sends the request for the video from a different camera, in an IP format, over an IP network to the surveillance server. However, if the user does not request a surveillance video portion from a different camera, the customer premises device continues to display the current multicast IP formatted video stream at block 812.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. § (b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system comprising:
   a processing system including a processor; and
   a memory that stores executable instructions that, when executed by the processing system, facilitate performance of operations, comprising:
   determining an available bandwidth in a communication network;
   receiving a user-generated request for first video surveillance from a first camera and a second video surveillance from a second camera, wherein a plurality of cameras includes the first camera and the second camera;
   determining to provide the first video surveillance and one or more still images from the second video surveillance based on the available bandwidth;
   creating an internet protocol formatted video in a multicast stream to be provided over the communication network, the video including a first video surveillance portion from the first camera, and a still image surveillance portion that is periodically updated by the second camera of the plurality of cameras to obtain periodically updated still image surveillance images that are each presented concurrently in a graphical user interface at a display device, wherein the graphical user interface comprises a plurality of display regions that concurrently present the first video surveillance portion, the still image surveillance portion, a community information portion, and an advertising portion, wherein the plurality of display regions do not interfere with each other, wherein a single video surveillance is provided from a single one of the plurality of cameras at a time and still image surveillance from the second camera, wherein the community information portion presents weather information or traffic information, and wherein the advertising portion comprises an advertisement obtained from an advertising database external to the processing system and remote from the display device;
   receiving a directive based on a selection from among the plurality of cameras via user input highlighting the still image surveillance portion of the plurality of display regions being presented in a display window in the graphical user interface, wherein the directive is to update the video to include video surveillance from the second camera of the plurality of cameras and still image surveillance from the first camera, wherein the second camera corresponds to a source of the still image surveillance portion that was presented in the display window that was highlighted, wherein the plurality of cameras are positioned at different locations; and
   responsive to the receiving of the directive:
   obtaining a second video surveillance portion from the second camera of the plurality of cameras;
   removing the first video surveillance portion from the multicast stream;
   adding the second video surveillance portion to the multicast stream; and
   adding a first updated still image surveillance portion from the first camera of the plurality of cameras to the multicast stream.

2. The system of claim 1, wherein the processing system comprises a plurality of processors operating in a distributed processing environment.

3. The system of claim 1, wherein the operations further comprise sending the multicast stream to a router.

4. The system of claim 1, wherein the graphical user interface enables movement control over the plurality of cameras based on user input at the graphical user interface, and wherein the plurality of cameras do not allow for automatic movement control.

5. The system of claim 1, wherein the graphical user interface is presented at a television, and wherein the plurality of cameras are positioned in different locations to monitor common areas within a customer premises.

6. The system of claim 5, wherein the graphical user interface allows the selection from among the plurality of cameras to be made from any one of a group of customer premises devices.

7. The system of claim 1, wherein the operations further comprise determining a time period for periodic update of the still image surveillance portion and periodically updating the still image surveillance portion.

8. A machine-readable storage medium, comprising executable instructions that, when executed by a processing system including a processor, facilitate performance of operations, comprising:
   determining an available bandwidth in a communication network;
   receiving a user-generated request for first video surveillance from a first camera and a second video surveillance from a second camera, wherein a plurality of cameras includes the first camera and the second camera;
   determining to provide one or more still images from the first video surveillance and the second video surveillance based on the available bandwidth;
   receiving a directive from equipment of a customer to transmit, over the communication network, the first video surveillance from the first camera, wherein the directive is generated based on user input highlighting a first still image surveillance portion for the first camera that is being presented in a target display window of multiple display windows in a graphical user interface presenting an internet protocol formatted video, wherein the internet protocol formatted video comprises a community information portion, an advertising portion, a video surveillance portion from the second camera of the plurality of cameras, and a still image surveillance portion that is periodically updated by the first camera and each of other cameras of the plurality of cameras to obtain updated still image surveillance images for simultaneous presentation in the graphical user interface in display regions that do not interfere with each other, wherein the community information portion presents weather information or traffic information, and wherein the advertising portion comprises an advertisement obtained from an advertising database external to the processing system and remote from the equipment of the customer; and responsive to the receiving of the directive:

replacing the video surveillance portion from the second camera with first video surveillance from the first camera within an updated multicast stream; and replacing the still image surveillance portion for the first camera with a second still image surveillance portion from the second camera within the updated multicast stream.

9. The machine-readable storage medium of claim 8, wherein the operations further comprise transmitting to equipment of a plurality of customers an updated internet protocol formatted video containing the updated multicast stream.

10. The machine-readable storage medium of claim 9, wherein the processor updates the internet protocol formatted video to include the updated still image surveillance images from the other cameras, wherein the equipment of the plurality of customers present the video surveillance portion from the first camera of the plurality of cameras in a first portion of a display device, and the still image surveillance images in a second portion of the display device.

11. The machine-readable storage medium of claim 9, wherein the plurality of cameras are located at a community premises, and wherein the equipment of the plurality of customers comprise a media processor, and wherein the graphical user interface presents additional information associated with the community premises including video content descriptive of the community premises and community events.

12. The machine-readable storage medium of claim 9, wherein the internet protocol formatted video further comprises the advertisement portion that is a video stream.

13. The machine-readable storage medium of claim 12, wherein the processor is in communication with the advertisement database over an internet protocol (IP) communication network, wherein the processor comprises a plurality of processors operating in a distributed processing environment.

14. The machine-readable storage medium of claim 13, wherein the advertisement database supplies the advertisement portion to the processor via the IP network.

15. The machine-readable storage medium of claim 14, wherein the advertisement portion is stored on the equipment of the plurality of customers in its entirety prior to playback, and wherein the processor transmits the updated internet protocol formatted video responsive to a determination of available bandwidth.

16. A method comprising:

receiving, by a processing system including a processor of a backend server, video from a plurality of cameras located at a customer premises;

determining an available bandwidth in a communication network;

receiving a user-generated request for first video surveillance from a first camera and a second video surveillance from a second camera, wherein the plurality of cameras includes the first camera and the second camera;

determining to provide the first video surveillance and one or more still images from the second video surveillance based on the available bandwidth;

creating, by the processing system, an internet protocol formatted multicast video stream for the communication network comprising a community information portion, an advertising portion, a first video surveillance portion from the first camera, and a still image surveillance portion that is periodically updated by each of other cameras of the plurality of cameras including the second camera to obtain a periodically updated still image portion for simultaneous presentation in a graphical user interface including multiple display windows that do not interfere with each other, wherein one video portion is created from a single one of the plurality of cameras at a time, while still image surveillance images are created from the other cameras, wherein the community information portion presents weather information or traffic information, and wherein the advertising portion comprises an advertisement obtained from an advertising database external to the processing system and remote from equipment of the user; and in response to a request for different video content from the second camera, wherein the request is generated based on user input highlighting a second still image surveillance portion for the second camera that is being presented in a target display window of the multiple display windows:

obtaining, by the processing system, a second video surveillance portion from the second camera;

removing, by the processing system, the first video surveillance portion from the multicast video stream;

obtaining, by the processing system, a first periodically updated, still image from the first camera;

adding, by the processing system, the second video surveillance portion and the first periodically updated, still image to the multicast video stream along with periodically updated still images from the other cameras, to create an updated multicast stream; and sending, by the processing system, the updated multicast stream to a router, wherein the request for different video content is generated based on a highlighting of a single still image from the second camera from among a group of still images from the other cameras.

17. The method of claim 16 further comprising including, by the processing system, an audio stream associated with the video from the first camera.

18. The method of claim 16 wherein the first camera is a digital video camera.

19. The method of claim 16 wherein the first camera is an internet protocol video camera.

20. The method of claim 16 further comprising outputting, by the processing system, an image from the second camera in addition to the video.

* * * * *